(12) United States Patent
Shiraki et al.

(10) Patent No.: US 6,362,812 B2
(45) Date of Patent: *Mar. 26, 2002

(54) ELECTRONIC DEVICE AND DISPLAY SYSTEM EMPLOYING THE SAME

(75) Inventors: Tatsuya Shiraki, Shiki-gun; Masanori Sano, Nara, both of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/212,215

(22) Filed: Dec. 16, 1998

(30) Foreign Application Priority Data

Jan. 19, 1998 (JP) .......................................... 10-007120

(51) Int. Cl.$^7$ ................................................ G09G 5/00
(52) U.S. Cl. ...................... 345/168; 345/156; 345/169; 353/122; 353/119; 434/201; 434/323; 434/325; 434/157; 434/167
(58) Field of Search ................................. 345/168, 156, 345/169; 364/705, 709, 710; 434/157, 169, 185, 188, 167; 353/122, 119

(56) References Cited

U.S. PATENT DOCUMENTS

| | | | |
|---|---|---|---|
| 5,250,929 A | 10/1993 | Hoffman et al. ............. | 345/146 |
| 5,392,081 A * | 2/1995 | Tarnay et al. ................ | 353/119 |
| 5,455,905 A * | 10/1995 | Kaya et al. ................... | 395/162 |
| 5,836,666 A * | 11/1998 | Aoyama et al. ............. | 353/122 |
| 5,943,247 A * | 8/1999 | Kaya et al. ................... | 364/709.12 |

FOREIGN PATENT DOCUMENTS

| | | |
|---|---|---|
| EP | 0 7635 495 A1 | 10/1996 |
| JP | 58052737 | 3/1983 |
| JP | 63298236 | 12/1988 |
| JP | 06035640 A | 2/1994 |
| JP | 08275251 A | 10/1996 |

* cited by examiner

*Primary Examiner*—Richard Hjerpe
*Assistant Examiner*—Ali Zamani
(74) *Attorney, Agent, or Firm*—Dike Bronstein, Roberts & Cushman IP Group; David G. Conlin; David A. Tucker

(57) ABSTRACT

An electronic device includes: a key input section having a plurality of keys; a first display section for displaying a display data; a first display control section for controlling the first display section; a communication section for transmitting the display data to a display device, the display device being separable from the electronic device and including a second display section for displaying the display data and a second display control section for controlling the second display section; a main data memory for storing a main data; a table memory for storing a table of key names in association with the keys; a key name memory for storing, as a key name data, a key name retrieved from the table memory when a key corresponding to the key name is pressed; and a main control section for allowing the first display section and the second display section to display data which are stored in the main data memory and in the key name memory, via the first display control section and the second display control section.

7 Claims, 12 Drawing Sheets

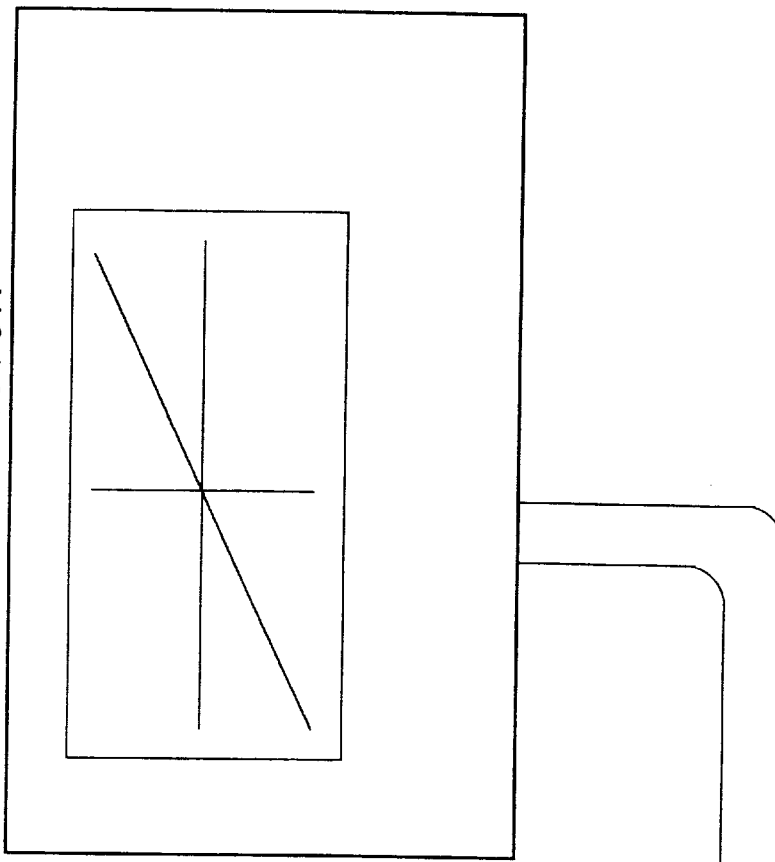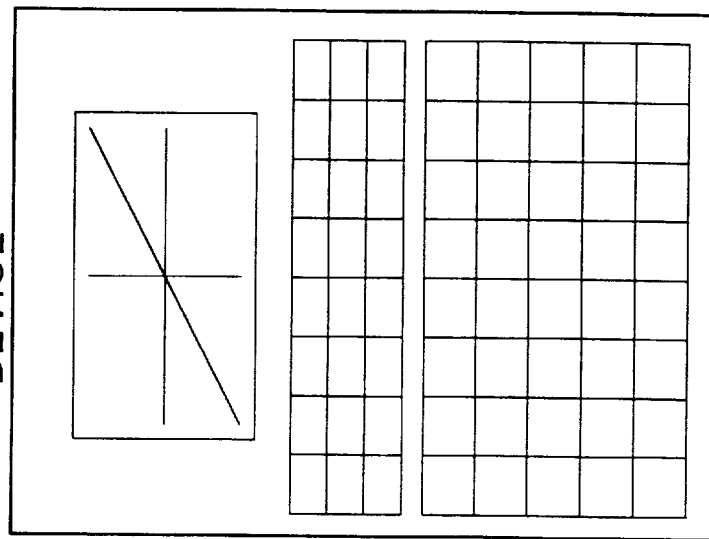
FIG.2 PRIOR ART

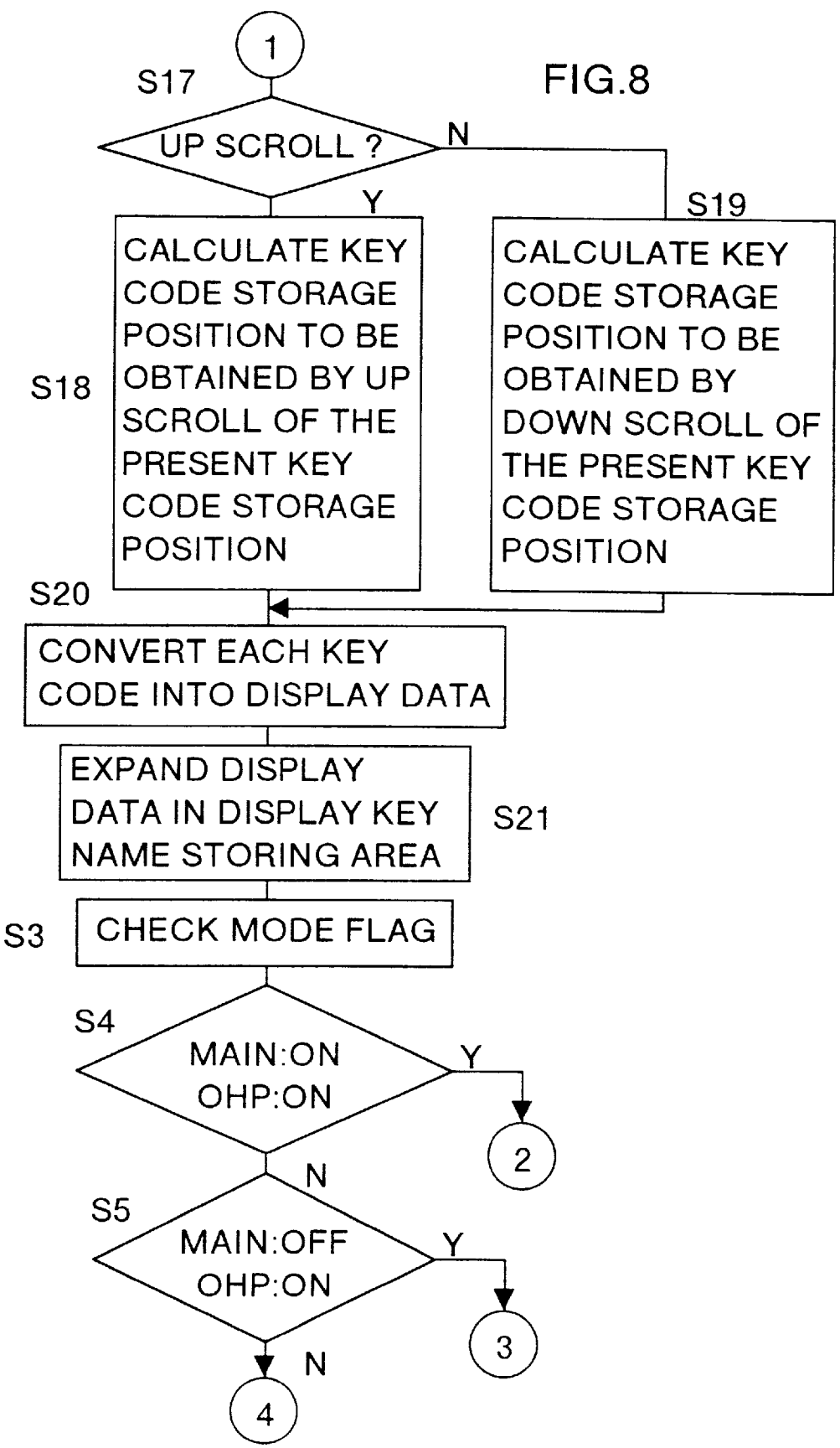

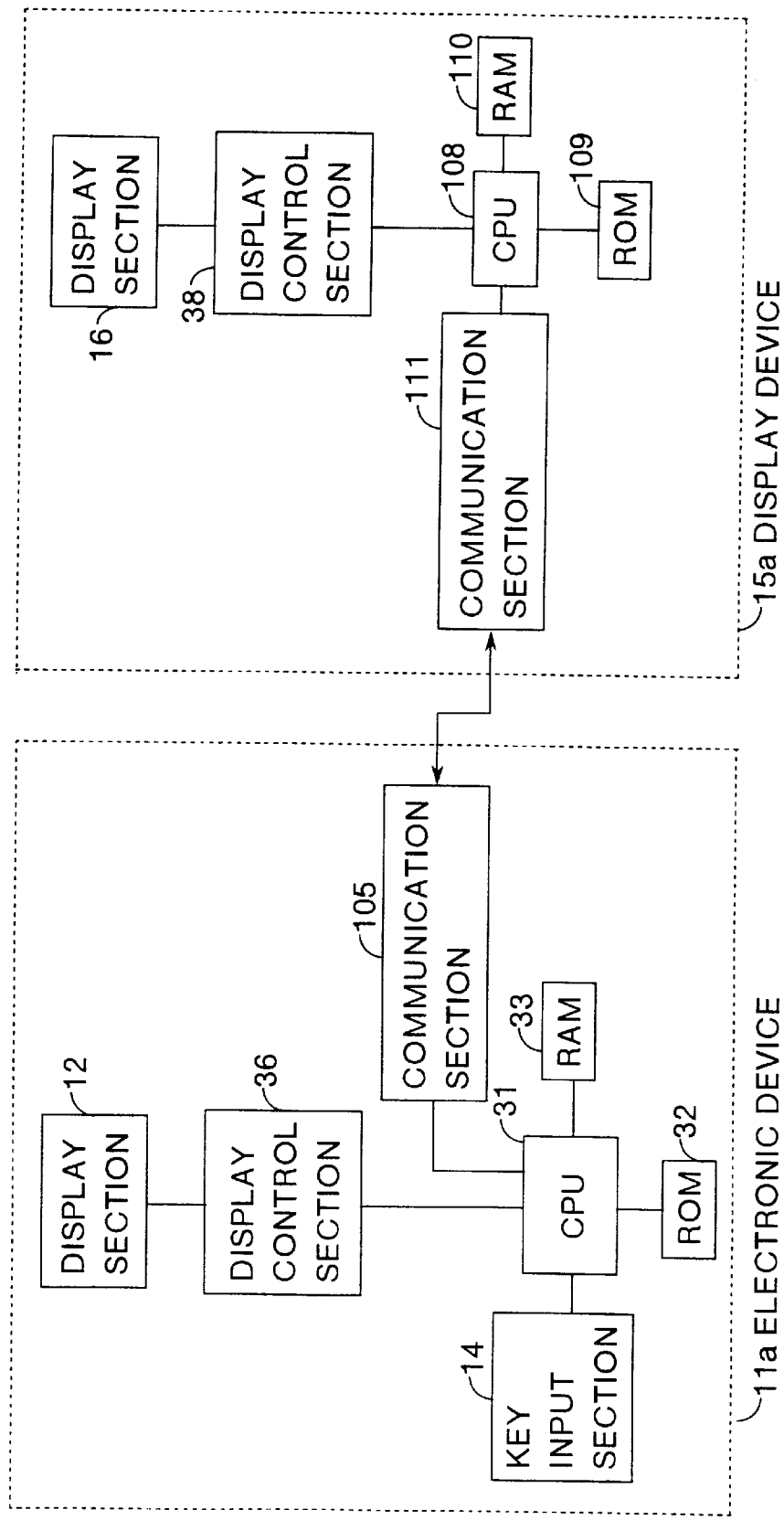

ELECTRONIC DEVICE AND DISPLAY SYSTEM EMPLOYING THE SAME

CROSS-REFERENCES TO RELATED APPLICATIONS

This application is related to Japanese patent application No. HEI 10-007120 filed on Jan. 19, 1998 whose priority is claimed under 35 USC §119, the disclosure of which is incorporated herein by reference in its entirety.

BACKGROUND OF THE INVENTION

1. Field of the Invention

The present invention relates to an electronic device and a display system employing the same, and more particularly to an electronic device capable of being connected to a display device, such as an overhead projector (hereafter referred to as "OHP"), which is utilized for displaying data and explaining operation procedures of the electronic device, and a display system employing the same. The electronic device may be, for example, an electronic function calculator, an electronic notebook, or a personal computer, capable of performing a function-calculating operation.

2. Description of the Related Art

Heretofore, it is known in the art to connect a personal computer or the like, equipped with a first display device, to a separate second display device, such as a projector often used in presentations or the like, so as to display on the second display device the same data as the one displayed on the first display device.

In such a case, the second display device such as a projector often has a large screen because it is used for presentations, and the operator (presenter) operates the personal computer or the like to allow desired images to be displayed.

Japanese Unexamined Patent Publication No. HEI 8(1996)-275251 discloses a method for transmitting and receiving, at a higher speed and with improved reliability, key data and calculated data by means of infrared communication (serial communication) between an electronic device and a transparency-type display device capable of being connected thereto in displaying on the transparency-type display device the same data as the one displayed on the display section of the electronic device, and a method for processing these data.

Japanese Unexamined Patent Publication No. HEI 06(1994)-35640 discloses a method for transmitting key codes from an electronic device to a display device capable of being connected thereto via a cable (serial communication) in displaying on the display device the same data as the one displayed on the display section of the electronic device.

However, according to the prior art as shown above, participants in the lecture meeting other than the operator do not know what operation the operator is performing while the presentation is carried out by displaying on a separate display device the same image data as those displayed on the personal computer connected thereto on the basis of the operations performed on the personal computer.

For example, it is often necessary to perform an operation while orally explaining about the operation using an expression such as "Here, when the [PF1] key is pressed, . . ." in giving an explanation, for example, of an application software. In such a case, if the explanation cannot be heard, the participants other than the operator does not know what operation the operator is performing.

SUMMARY OF THE INVENTION

The present invention has been made in order to solve these problems, and the purpose thereof is to provide an electronic device, such as a personal computer, that allows a person other than the operator to confirm the operator's operation by displaying, on a display screen of a display device such as a projector connected to the electronic device, an operation data showing how the operator is operating the electronic device, together with an image data displayed on the electronic device.

Accordingly, the present invention provides an electronic device including: a key input section having a plurality of keys; a first display section for displaying a display data; a first display control section for controlling the first display section; a communication section for transmitting the display data to a display device, the display device being separable from the electronic device and including a second display section for displaying the display data and a second display control section for controlling the second display section; a main data memory for storing a main data; a table memory for storing a table of key names in association with the keys; a key name memory for storing, as a key name data, a key name retrieved from the table memory when a key corresponding to the key name is pressed; and a main control section for allowing the first display section and the second display section to display data which are stored in the main data memory and in the key name memory, via the first display control section and the second display control section.

Also, the present invention provides a display system including an electronic device and a display device, the electronic device including a key input section having a plurality of keys, a first display section for displaying a display data, and a first display control section for controlling the first display section, the display device being separable from the electronic device and including a second display section for displaying the display data and a second display control section for controlling the second display section, the electronic device further including: a communication section for transmitting the display data to the display device; a main data memory for storing a main data; a table memory for storing a table of key names in association with the keys; a key name memory for storing, as a key name data, a key name retrieved from the table memory when a key corresponding to the key name is pressed; and a main control section for allowing the first display section and the second display section to display data which are stored in the main data memory and in the key name memory, via the first display control section and the second display control section.

BRIEF DESCRIPTION OF THE DRAWINGS

The present invention will be better understood from the following detailed description of preferred embodiments of the invention, taken in conjunction with the accompanying drawings, in which:

FIG. 2 is a view schematically illustrating an electronic device and a display device according to prior art;

FIG. 8 is a flowchart showing a flow of procedures according to the embodiment of the present invention;

FIG. 11 is a block diagram illustrating a construction of another embodiment of the present invention.

DETAILED DESCRIPTION OF THE PREFERRED EMBODIMENTS

In the electronic device and the display system of the present invention, the main control section may be capable of selecting whether or not the key name data is to be displayed in the first display section and whether or not the key name data is to be displayed in the second display section.

The key name memory may store name data of a predetermined number of recently-input keys successively as key name data.

The main control section may allow at least one of the first display section and the second display section to display, by a scrolling operation, the key name data stored in the key name memory.

The electronic device according to the present invention may be, for example, an electronic notebook or a personal computer. The display device may be, for example, an overhead projector (a display device for overhead projection, hereafter referred to as "OHP") or a plasma display device. Accordingly, the first display section may include a liquid crystal display device, a CRT, or the like. The second display section may include a liquid crystal panel for OHP, a plasma display panel, or the like. Here, the electronic device and the display device may be formed either as an integral body or as separate bodies.

The key input section may be, for example, a keyboard, a tablet switch, a touch panel, or the like. The communication section for transmitting the display data to the display device may be any known wired, wireless, or optical communication device.

The display data memory for storing the main data and the key name memory for storing key name data may be formed of a RAM. The table memory for pre-storing the table of key names in association with the keys may be formed of a ROM. The main control section may be formed of a CPU.

Figure 1:
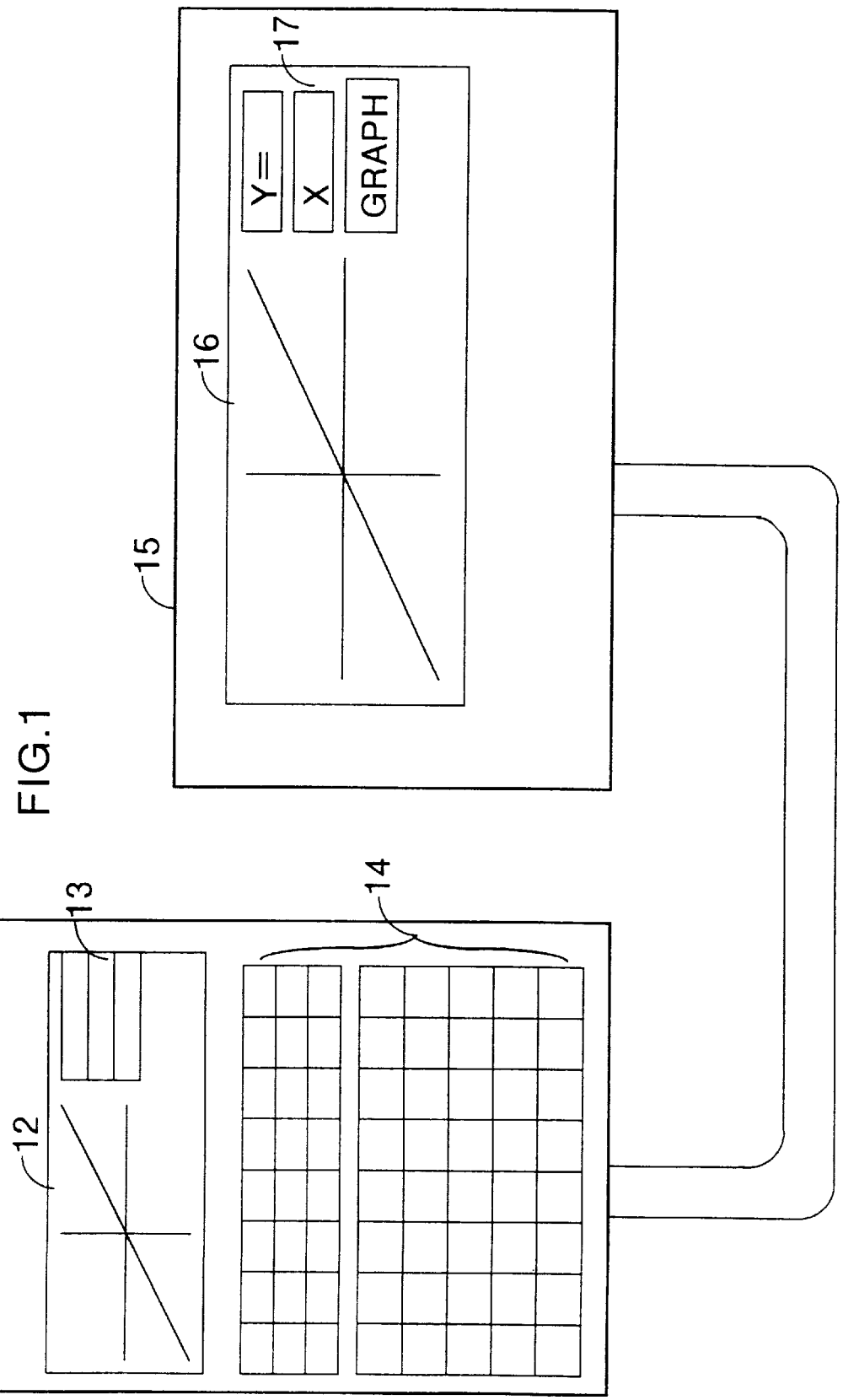
FIG. 1 is a view schematically illustrating a first embodiment of the present invention.

The present invention will be detailed with reference to the accompanying drawings. FIG. 1 is a view schematically illustrating a first embodiment of the present invention. Referring to FIG. 1, an electronic device 11 and a display device 15 are shown. In this embodiment, the electronic device is a small portable information terminal, and the display device is a projector (OHP) capable of displaying data on a large screen by projection. However, the present invention should not be limited to this embodiment alone.

The results corresponding to key operations input from a key input section 14 of the electronic device 11 are displayed on a display section 12 of the electronic device 11 and, at the same time, displayed on a display section 16 of the display device 15. At this moment, key names are also displayed on a key name display area 13 of the display section 12 of the electronic device 11 and, at the same time, displayed on a key name display area 17 of the display section 16 of the display device 15.

Figure 3:
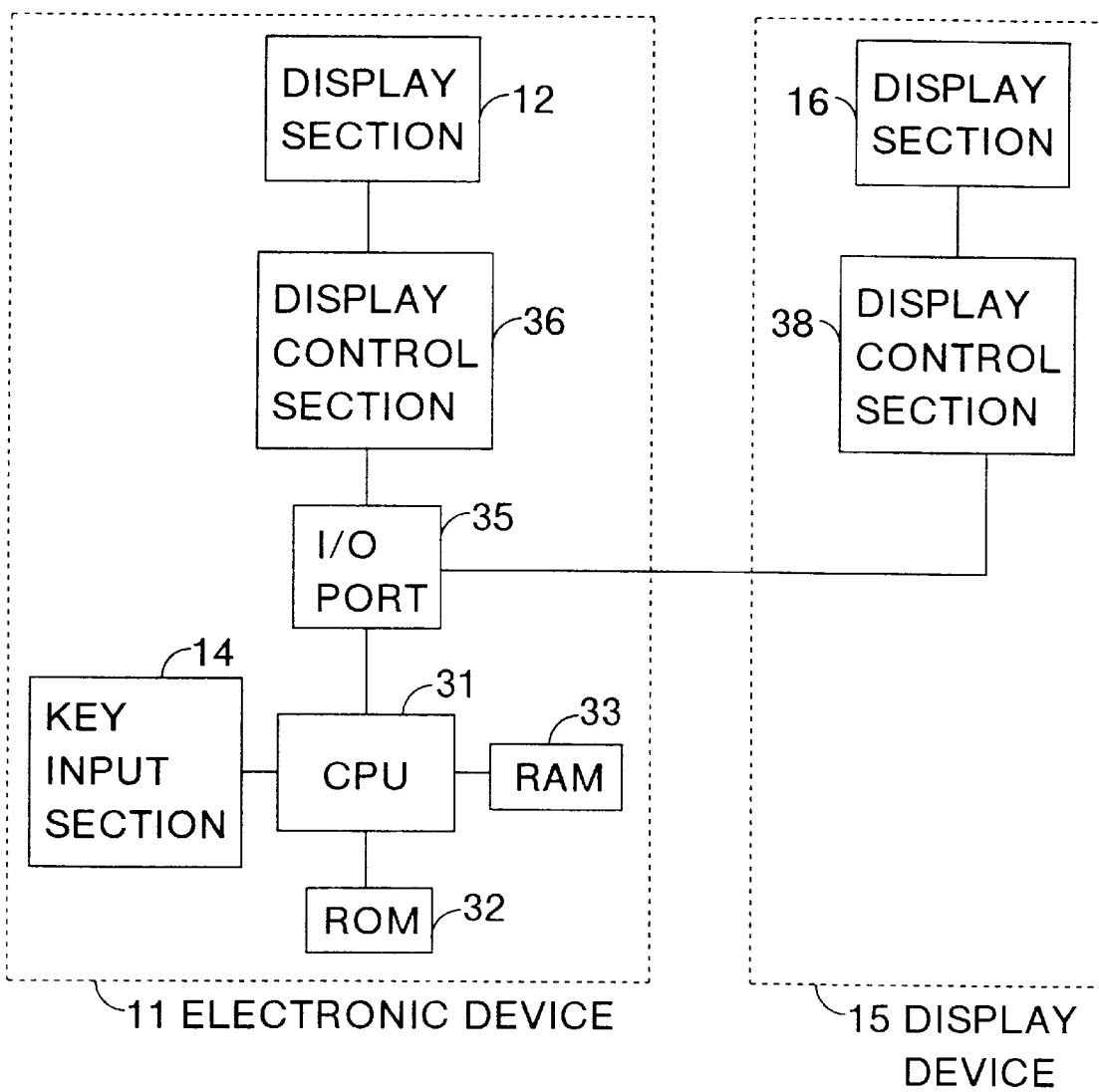
FIG. 3 is a block diagram illustrating a construction of the first embodiment of the present invention.

FIG. 3 is a view showing a circuit construction of the electronic device 11 and the display device 15. Referring to FIG. 3, the electronic device 11 includes a CPU 31, a ROM 32 connected to the CPU 31, a RAM 33, a key input section 14, an I/O port 35, a display control section 36, and a display section 37. The display device 15 includes a display control section 38 and a display section 16.

Figure 4:
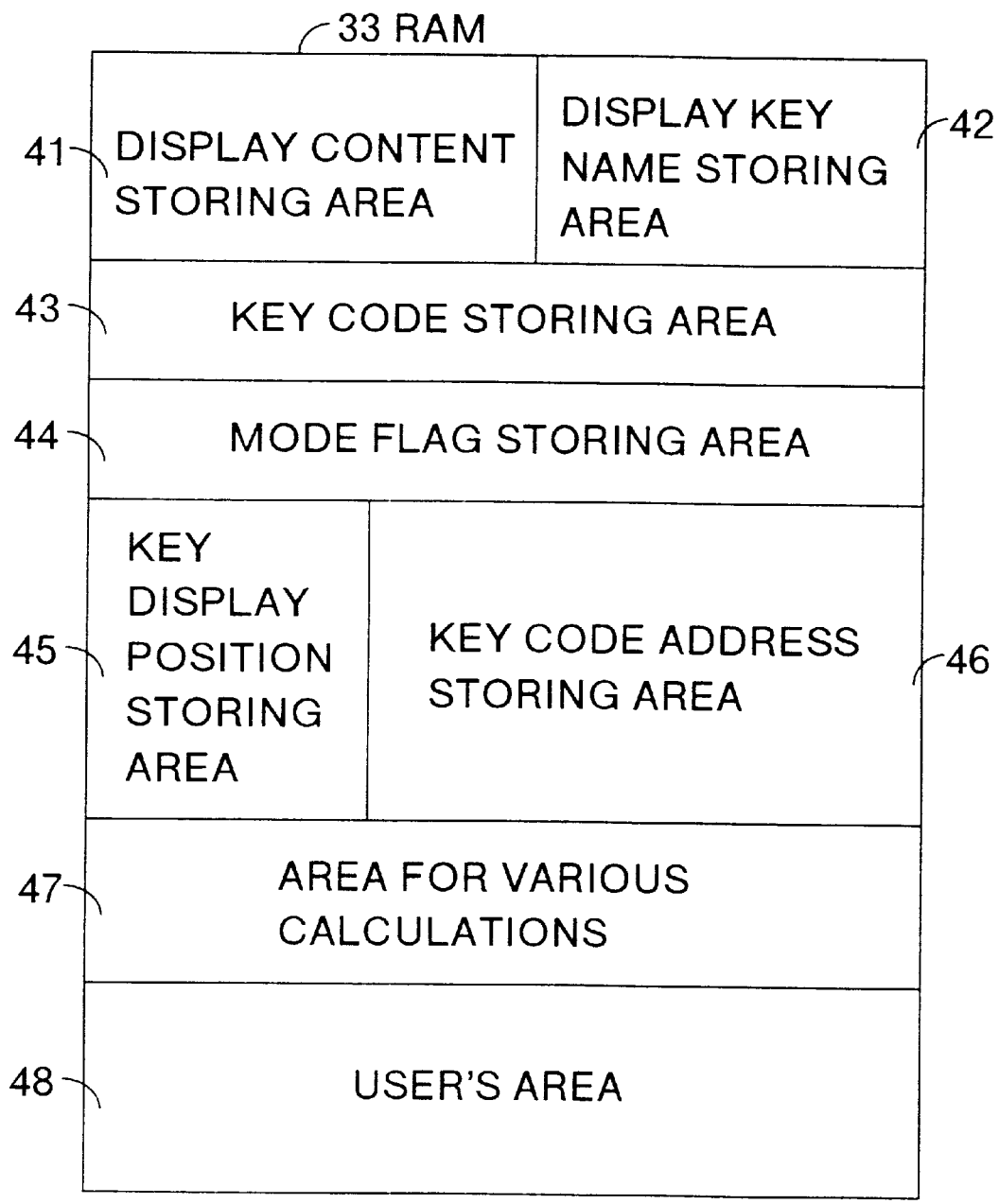
FIG. 4 is a view showing a construction inside a RAM of FIG. 3 according to the present invention.

The RAM 33 is backed up so that the data stored therein are held even if the power supply is turned off. Referring to FIG. 4, the RAM 33 includes a display content storing area 41, a display key name storing area 42, a key code storing area 43, a mode flag storing area 44, a key display position storing area 45, a key code address storing area 46, an area 47 for various calculations, and a user's area 48.

The display content storing area 41 is an area for storing display contents in order to display the results obtained when the data input from the key input section 34 by the user are processed by the CPU 31. The display key name storing area 42 is an area for storing key codes obtained by converting the names of the keys that are operated by the user. These storing areas are in one-to-one correspondence with the display section 37 of the electronic device 11, and also in one-to-one correspondence with the display section 39 of the display device 15. The key code storing area 43 is a queue-type area and successively stores the input key codes one after another. The mode flag storing area 44 is an area for storing display modes. The key display position storing area 45 is an area for storing pointers that indicate the display positions in the key name display areas 13, 17. The key code address storing area 46 is an area for storing pointers of the addresses of the key codes that are stored in the key code storing area 43. The area 47 for various calculations is an area for performing calculations in response to the user's operations on the key input section 34. The user's area 48 is an area for storing user's data, for example, graphs or formulas.

Figure 5:
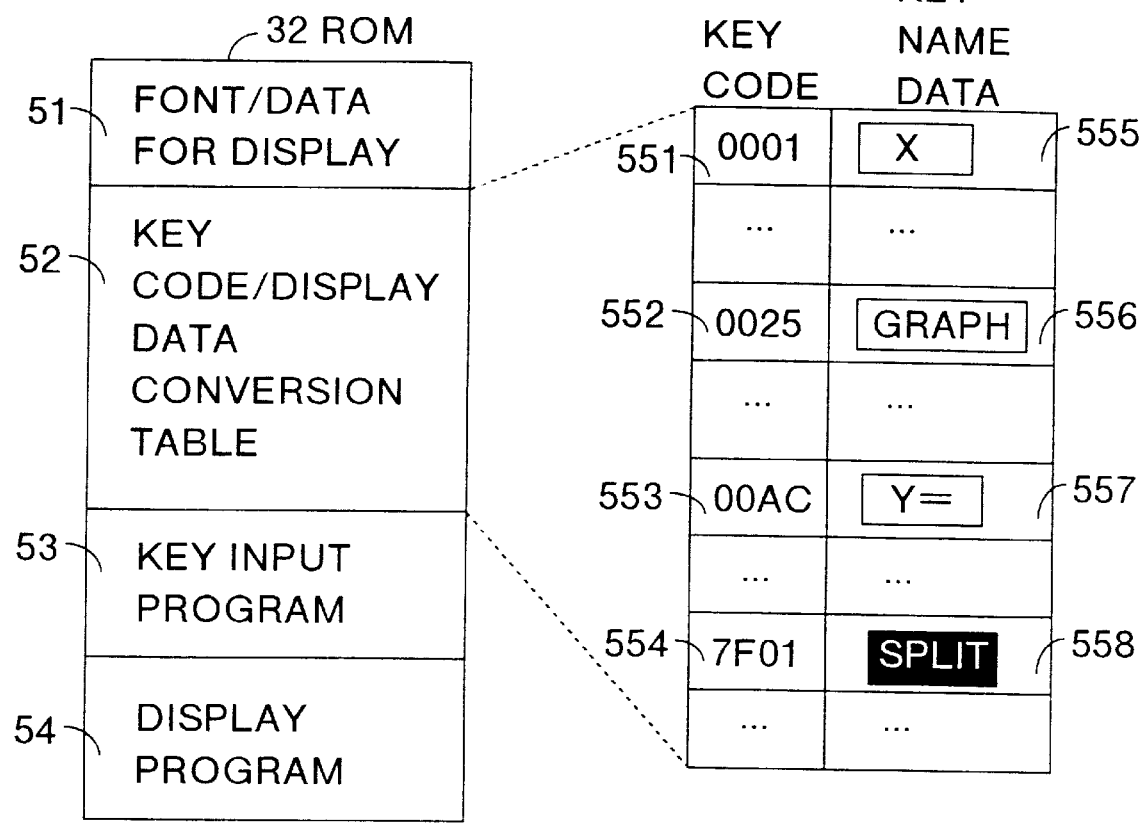
FIG. 5 is a view showing a construction inside a ROM of FIG. 3 according to the present invention.

Referring to FIG. 5, the ROM 32 is an area that stores various programs for processing data in response to user's key operations and programs for controlling peripheral circuits. The ROM 32 includes a font/data 51 for display, a table 52 for converting key codes into display data, a key input program 53, and a display program 54.

The table 52 stores display data corresponding to key codes. For example, a key X (key code: 0001) 551 corresponds to display bit data 555 "[X]". Also, special keys such as second keys are stored as bit data in the table 52 (554, 558).

By the control from the CPU 31, the I/O port 35 (FIG. 3) can switch the display output destination to the display control section 36 of the electronic device 11 or to the display control section 38 of the display device 15. The display sections 37, 39 each may be, for example, a transparency-type liquid crystal display.

Figure 6:
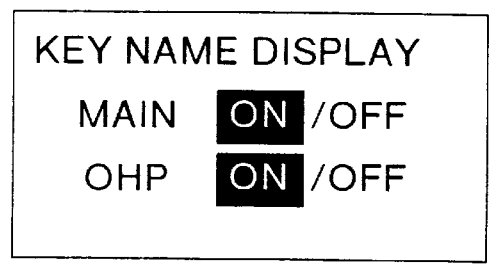
FIG. 6 is a view illustrating an example of screen display in a case where a display mode is changed on the electronic device side.
Figure 9A:
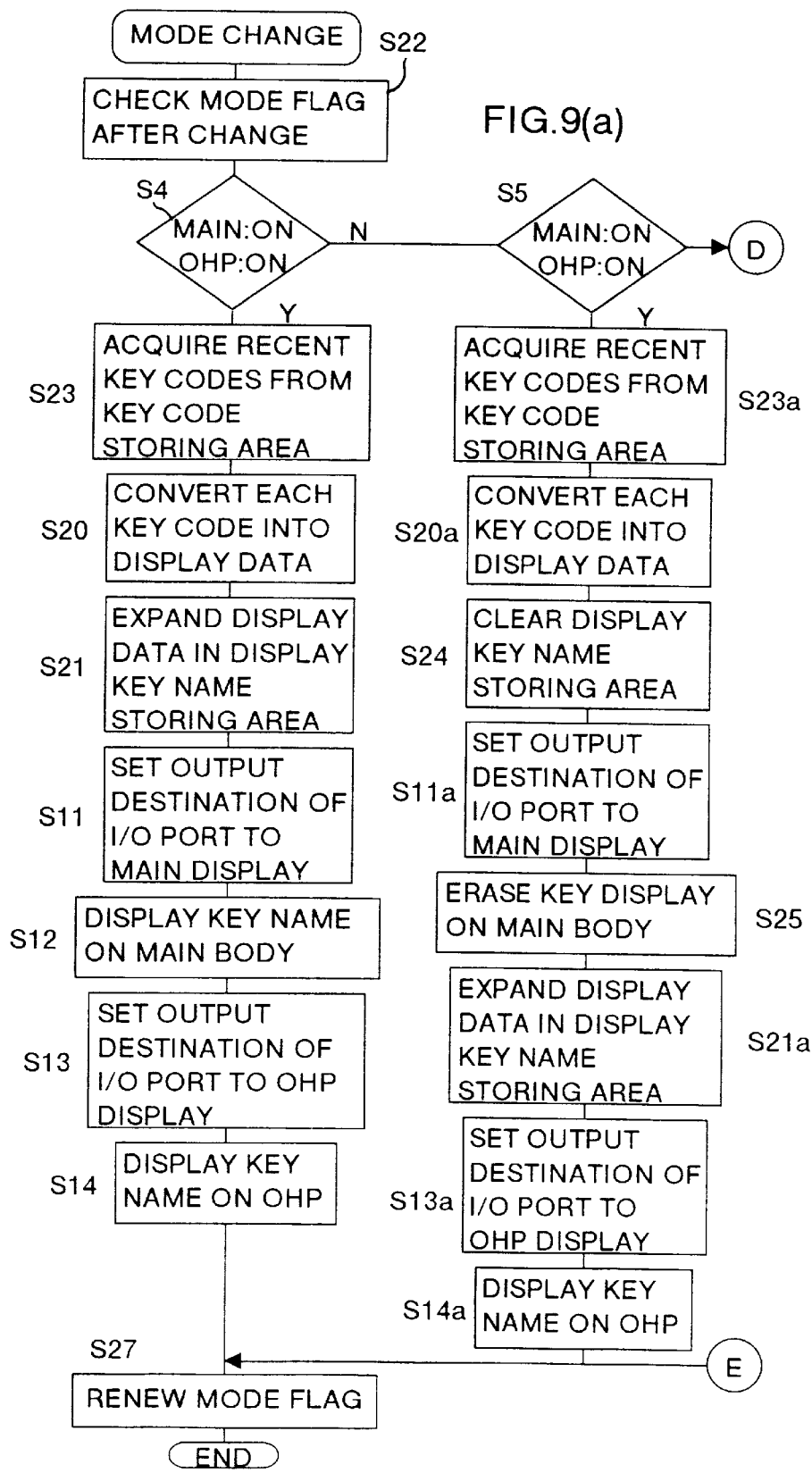
FIGS. 9(*a*) and 9(*b*) are flowcharts showing a flow of procedures after the display mode is changed according to the embodiment of the present invention.
Figure 9B:
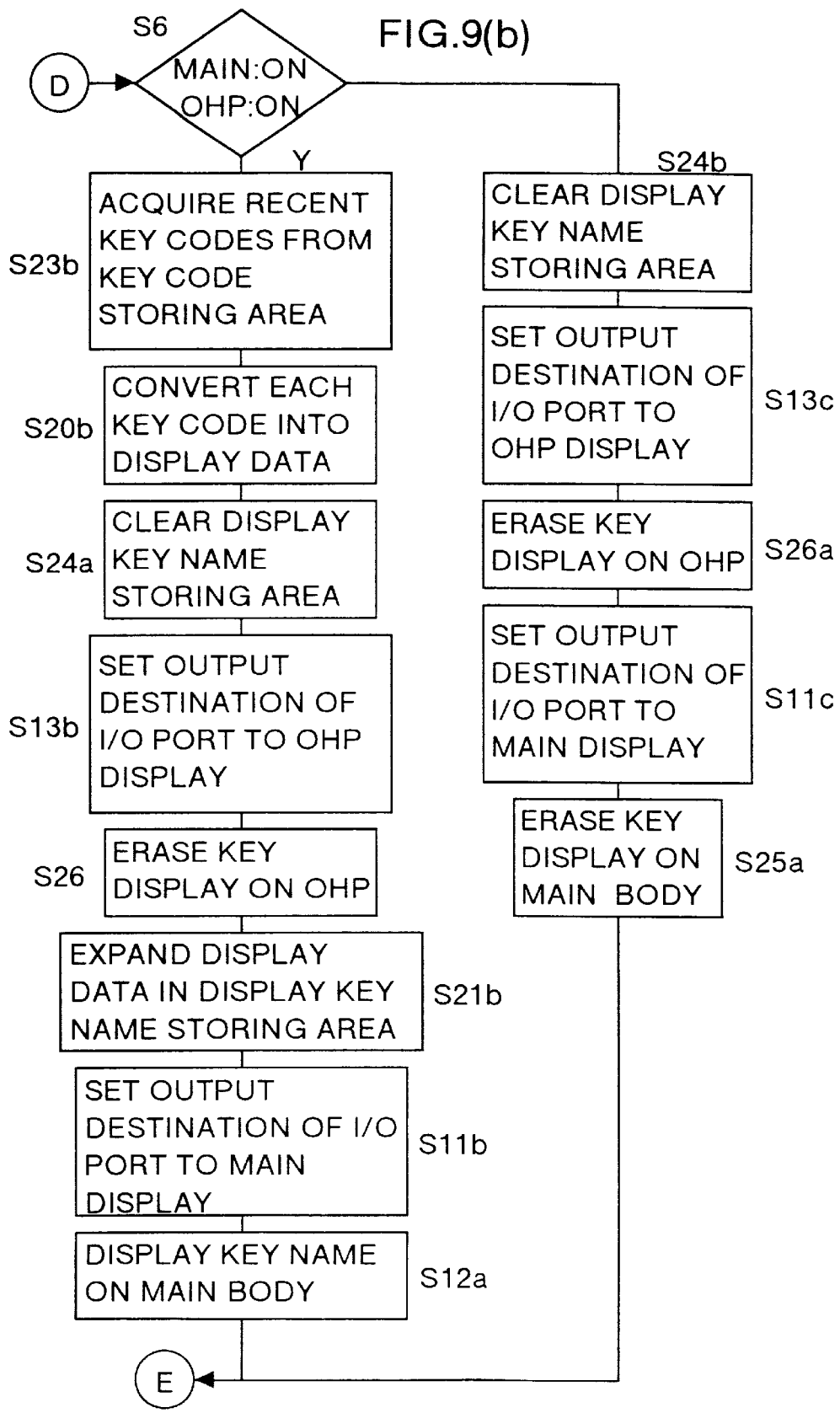

Next, the operations of the electronic device 11 and the display device 15 having the above-mentioned constructions will be explained with reference to FIGS. 6 to 9(*b*). Hereafter, the mode in which the key names are displayed on the display section 12 is referred to as "Main", and the mode in which the key names are displayed on the display section 16 is referred to as "OHP". FIG. 6 shows a setting screen for setting the key name display mode from the key input section 14. The setting screen is displayed on a portion of the display section 12, where the reverse display portion shows the current state. FIGS. 9(a) and 9(b) are flowcharts showing procedures after the mode setting. After a mode change is executed, the mode flag after the change is checked (S22).

If the set mode is "Main: ON and OHP: ON" (S4), the CPU 31 acquires recent key codes from the key code storing area 43 (S23), and converts the key codes into display data (S20). These display data are expanded in the display key name storing area 42 of the RAM 33 (S21) and, after the output destination of the I/O port 35 is set to the main display (S11), the key names are displayed on the main body (area 13 in the display section 12) (S12). After the output destination of the I/O port 35 is set to the OHP display (S13), the key names are displayed on the OHP (area 17 of the display section 16) (S14), and the mode flag is renewed (S27).

If the set mode is "Main: OFF and OHP: ON" (S5), the CPU 31 acquires recent key codes from the key code storing area 43 (S23a), and converts the key codes into display data (S20a) In order to delete the key names in the main body (display section 12), the display key name storing area 42 is cleared (S24). Then, after the output destination of the I/O port 35 is set to the main display (S11a), the key name display in the area 13 of the main body (display section 12) is cleared (S25). The display data converted in S20a are expanded in the display key name storing area 42 of the RAM 33 (S21a). Then, after the output destination of the I/O port 35 is set to the OHP display (S13a), the key names are displayed on the OHP (area 17 in the display section 16) (S14a), and the mode flag is renewed (S27).

If the set mode is "Main: ON and OHP OFF" (S6), the CPU 31 acquires recent key codes from the key code storing area 43 (S23b), and converts the key codes into display data (S20b) In order to delete the key names in the OHP (display section 16), the display key name storing area 42 is cleared (S24a) Then, after the output destination of the I/O port 35 is set to the OHP display (S13b), the key name display in the area 17 of the OHP (display section 16) is cleared (S26). The display data converted in S20b are expanded in the display key name storing area 42 of the RAM 33 (S21b). Then, after the output destination of the I/O port 35 is set to the main display (S11b), the key names are displayed on the main body (area 13 in the display section 12) (S12a), and the mode flag is renewed (S27).

If the set mode is "Main: OFF and OHP: OFF", the CPU 31 clears the display key name storing area 42 (S24b) in order to clear the key name display in the main body (display section 12) and the OHP (display section 16). Then, after the output destination of the I/O port 35 is set to the OHP display (S13c), the key name display in the area 17 of the OHP (display section 16) is cleared (S26a). Then, after the output destination of the I/O port 35 is set to the main display (S11c), the key name display in the area 13 of the main body (display section 12) is cleared (S25a), and the mode flag is renewed (S27).

Figure 7A:
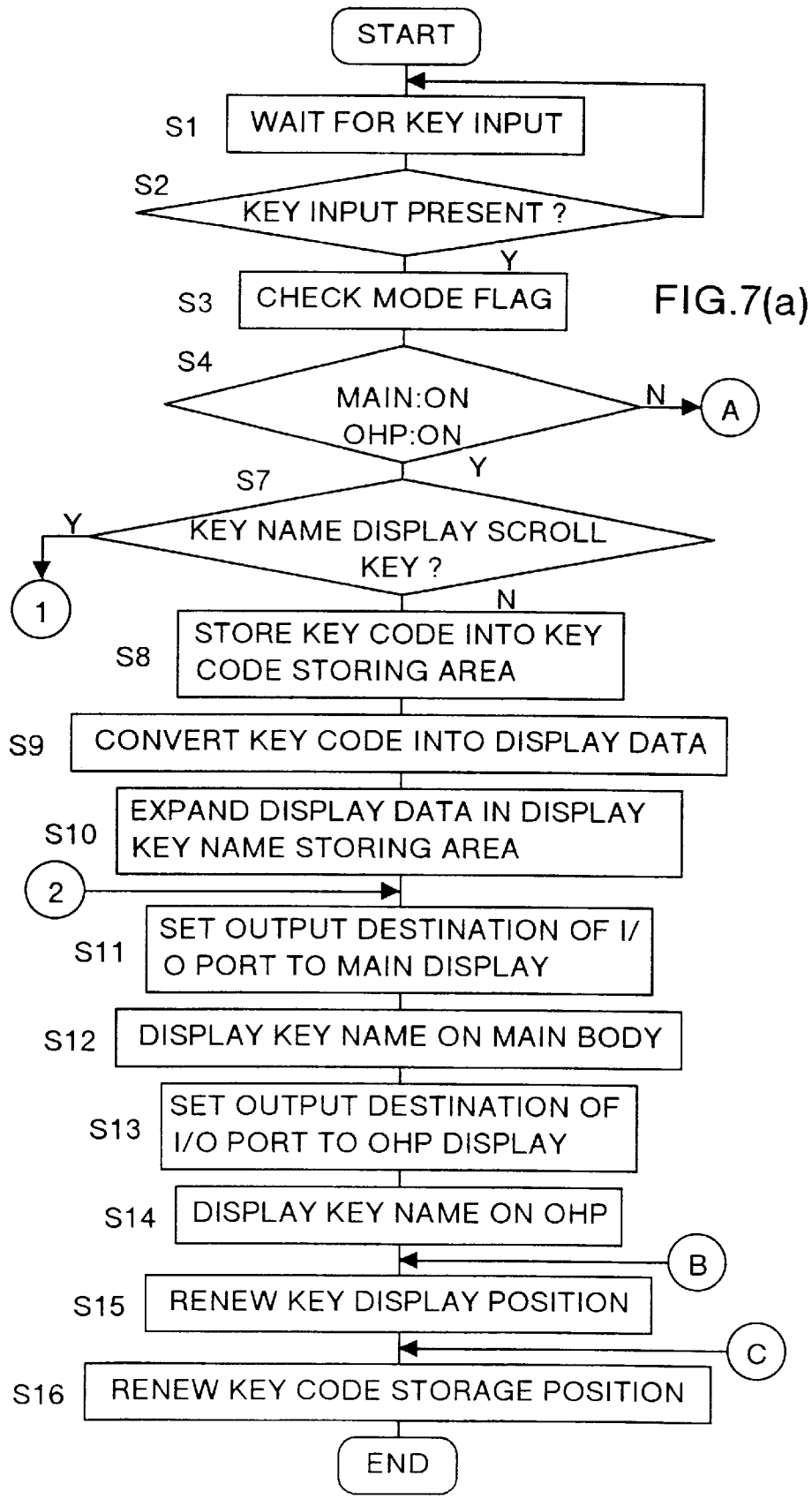
FIGS. 7(*a*) and 7(*b*) are flowcharts showing a flow of procedures according to the embodiment of the present invention.
Figure 7B:
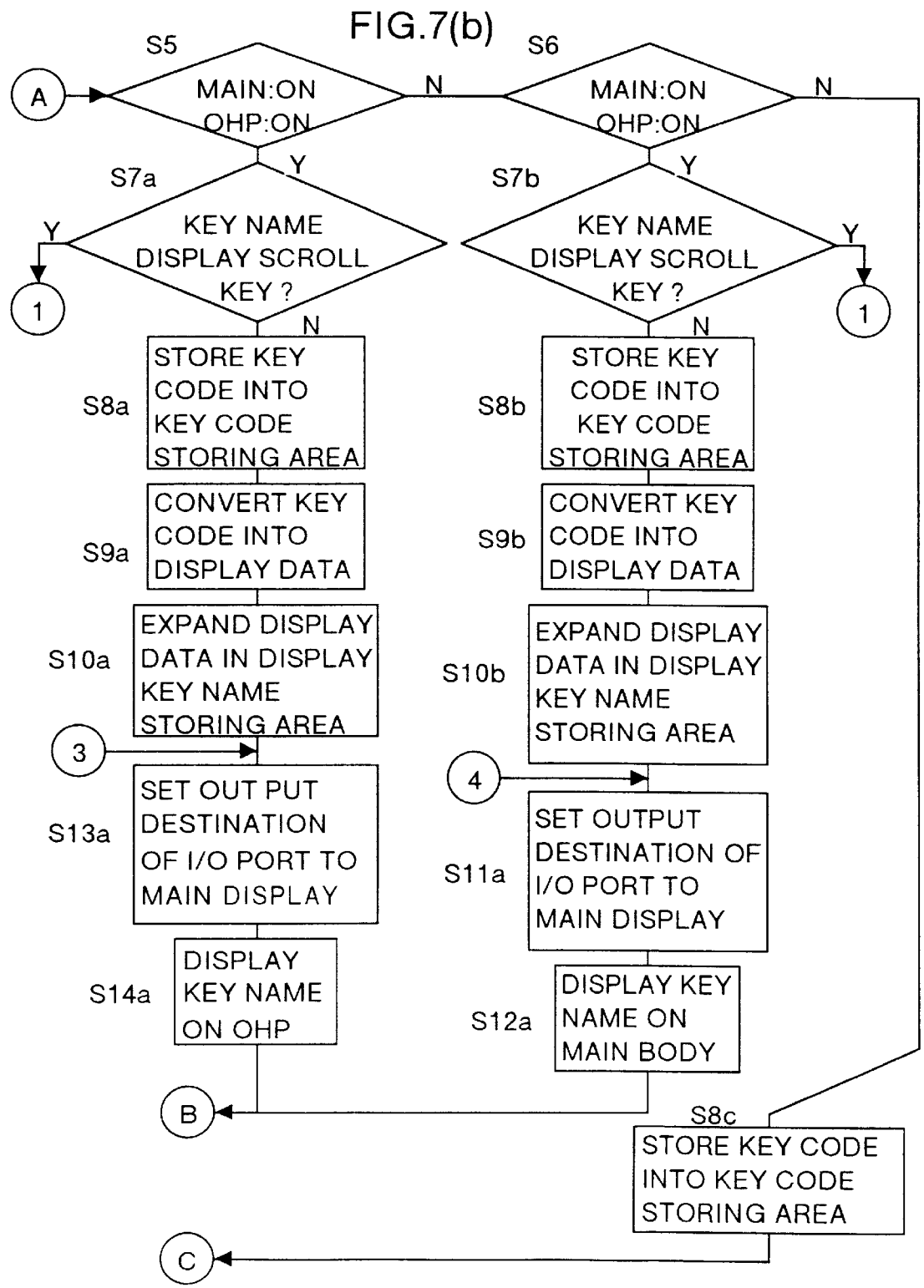

Next, the operations in various display modes will be explained with reference to the flowcharts shown in FIGS. 7(a), 7(b) and FIG. 8. The CPU 31 waits for key inputs from the key input section 14 (S1). If a key input is present, the CPU 31 checks the mode flag (S3). If the set mode is "Main ON and OHP: ON" (S4), the CPU 31 checks whether the input key is a key name display scroll key or not (S7). If the input key is not a scroll key, the key code is stored in the key code storing area 43 (S8). In order to display the key code, the CPU 31 converts the key code into a display data (S9) and expands the display data in the display key name storing area 42 (S10).

Thereafter, the CPU 31 sets the output destination of the I/O port 35 to the main display (S11), and displays the key name on the main body (display section 12) (S12). Then, the CPU 31 sets the output destination of the I/O port 35 to the OHP display (S13), and displays the key name on the OHP (display section 16) (S14). Thereafter, the key display position is renewed (S15), and the key code storage position is renewed (S16). These operations are repeated to display the most recent three key names on the display sections 12, 16, as shown in FIG. 1. The key names are successively renewed.

If the set mode is "Main: OFF and OHP: ON" (S5), the CPU 31 checks whether the input key is a key name display scroll key or not (S7a). If the input key is not a scroll key, the key code is stored in the key code storing area 43 (S8a). In order to display the key code, the CPU 31 converts the key code into a display data (S9a) and expands the display data in the display key name storing area 42 (S10a). Then, the CPU 31 sets the output destination of the I/O port 35 to the OHP display (S13a), and displays the key name on the OHP (display section 16) (S14a). Thereafter, the key display position is renewed (S15), and the key code storage position is renewed (S16).

If the set mode is "Main: ON and OHP: OFF" (S6), the CPU 31 checks whether the input key is a key name display scroll key or not (S7b) . If the input key is not a scroll key, the key code is stored in the key code storing area 43 (S8b) . In order to display the key code, the CPU 31 converts the key code into a display data (S9b) and expands the display data in the display key name storing area 42 (S10b). Then, the CPU 31 sets the output destination of the I/O port 35 to the main display (S11a), and displays the key name on the main body (display section 12) (S12a). Thereafter, the key display position is renewed (S15), and the key code storage position is renewed (S16).

If the set mode is "Main: OFF and OHP: OFF", the CPU 31 stores the key code in the key code storing area 43 (S8c), and renews the key code storage position (S16). Then, if it is determined in the step S7 that the input key is a key name display scroll key (key for scrolling the key name display), the CPU 31 checks whether the input key is an up-scroll key or not (S17). If the input key is an up-scroll key, the CPU 31 calculates a key code storage position to be obtained by up-scroll of the present key code storage position (S18). If the input key is a down-scroll key, the CPU 31 calculates a key code storage position to be obtained by down-scroll of the present key code storage position (S19). Thereafter, the CPU 31 converts each key code into a display data (S20), and expands each display data in the display key name storing area 42 (S21). Then, the mode flag is checked (S3) to determine the location to which the flow is to return for each case.

Figure 10:
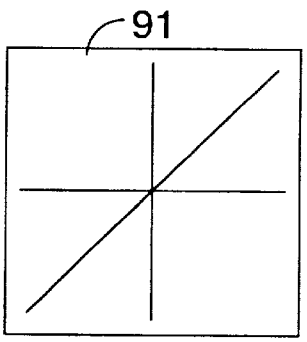
FIGS. 10(*a*) to 10(*d*) are views illustrating display examples in an electronic device having a display size smaller than that of a display device according to the present invention.
Figure 10:
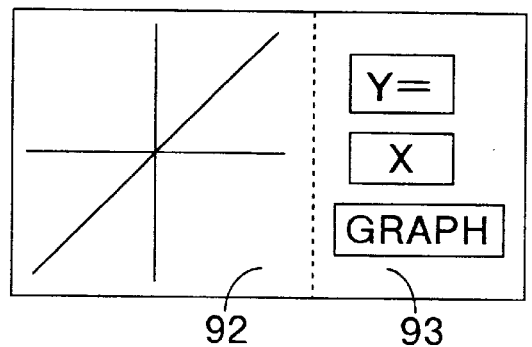
Figure 10:
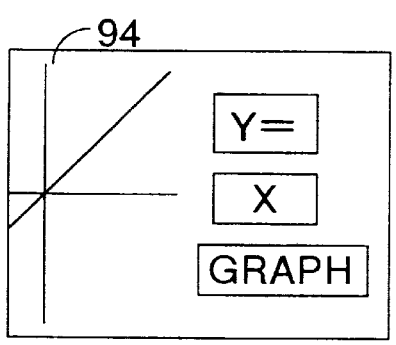
Figure 10:
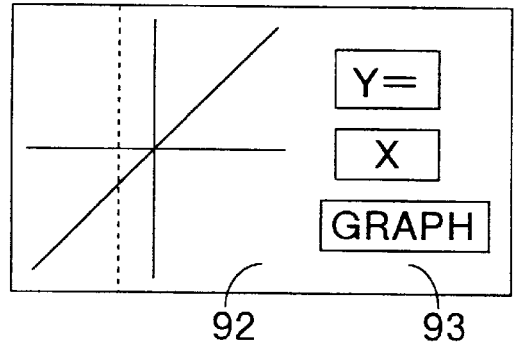

Next, a second embodiment of the present invention will be explained with reference to FIGS. 10(a) to 10(d). Referring to FIGS. 10(a) to 10(d), the display section 12 of the electronic device 11 does not include the key name display area 13 and/or the display section 16 of the display device 15 does not include the key name display area 17. FIG. 10(a) is an ordinary screen (91) where a graph of y=x is drawn by the electronic device 11. At this moment, the contents in the display content storing area 41 and the contents in the display key name storing area 42 of the RAM 33 are respectively represented by reference numerals 92 and 93 of FIGS. 10(b) and 10(d).

By operating a right scroll key of the key input section 14 for displaying key names, the display section 12 and/or the display section 16 can display the portion on the right side of the dotted line of FIG. 10(d) including the key names, as shown by 94 of FIG. 10(c). Also, since the contents in the display content storing area 41 and the contents in the display key name storing area 42 of the RAM 33 are not changed (92, 93), the original display (91) can be restored by a left scroll key of the key input section 14 for displaying an ordinary screen, as shown in FIG. 10(a).

Next, a third embodiment of the present invention will be explained with reference to FIG. 11. Referring to FIG. 11, the electronic device 11a is obtained by removing the I/O port 35 from the electronic device 11 shown in FIG. 3 and adding a communication section (105) thereto. The display device 15a is obtained by adding a CPU (108), a ROM (109), a RAM (110), and a communication port (111) to the display device 15 shown in FIG. 3. The other structures of the electronic device 11a are the same as those shown in FIG. 3. The ROM (109) and the RAM (110) of the display device have the same structures as those of the ROM 32 and the RAM 33 of the electronic device 11. The communication sections (105, 111) can communicate with each other via cable communication, optical communication, or wireless communication.

According to the present invention, the participants in the lecture meeting can confirm the key operations performed by the presenter without the oral explanation of the presenter. Also, the presenter can confirm his/her own key operations even if the presenter is at a position where it is difficult to see the screen of the display device. Therefore, the presenter can perform a smooth presentation. Also, by successively displaying the key operations, the participants can confirm the key operations without the oral explanation of the presenter, so that the participants can more fully understand the contents of the presentation.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. An electronic device comprising:
   a key input section having a plurality of keys;
   a first display section for displaying a display data;
   a first display control section for controlling the first display section;
   a communication section for transmitting the display data to a display device, the display device being separable from the electronic device and comprising a second display section for displaying the display data and a second display control section for controlling the second display section;
   a data processing section for processing a main data based on an output of the key input section;
   a main memory for storing the processed main data;
   a table memory for storing a table of key names, each of said key names being associated with a preselected one of the keys;
   a key name memory for storing, as key name data, key names retrieved from the table memory in response to the activation of selected ones of the keys; and
   a main control section for allowing the first display section and the second display section to display data stored in the main data memory and in the key name memory, via the first display control section and the second display control section, wherein each of the first and second display sections includes a first area and a second area, each first area successively displaying the key names of a predetermined number of most recently activated keys and each second area displaying processed main data.

2. The electronic device of claim 1, wherein the main control section selects whether the key name data is to be displayed in the first area of the first display section and whether the key name data is to be displayed in the first area of the second display section.

3. The electronic device of claim 1, wherein the key name memory stores the key names associated with a predetermined number of most recently activated keys successively as key name data.

4. The electronic device of claim 1, wherein the main control section allows at least one of the first area of the first display section and the first area of the second display section to display, by scrolling operation, the key name data stored in the key name memory.

5. The electronic device of claim 1, wherein the key name memory stores key name data of a predetermined number of most recently activated keys successively as key name data, and the main control section successively renews the key name data and allows the first area of the first display section and the first area of the second display section to display the key name data by a scrolling operation.

6. A display system comprising an electronic device and a display device,
   the electronic device comprising a key input section having a plurality of keys, a first display section for displaying display data, and a first display control section for controlling the first display section;
   the display device being separable from the electronic device and comprising a second display section for displaying the display data and a second display control section for controlling the second display section,
   the electronic device further comprising:
   a communication section for transmitting the display data to the display device;
   a data processing section for processing a main data based on an output of the key input section;
   a main data memory for storing the processed main data;
   a table memory for storing a table of key names, each said key name being associated with a preselected one of the keys;
   a key name memory for storing, as key name data, key names retrieved from the table memory in response to the activation of selected ones of the keys; and
   a main control section for allowing the first display section and the second display section to display data which are stored in the main data memory and in the key name memory, via the first display control section and the second display control section, wherein each of the first and second display sections includes a first area and a second area, each first area successively displaying the key names of a predetermined number of most recently activated keys and each second area displaying the processed main data.

7. The display system of claim 6, wherein the communication section transmits the display data to the display device via cable communication, optical communication, or wireless communication.

* * * * *